June 13, 1933.                H. C. LAUFE                1,913,811
                          SHAVING RECEPTACLE
                          Filed Dec. 30, 1929
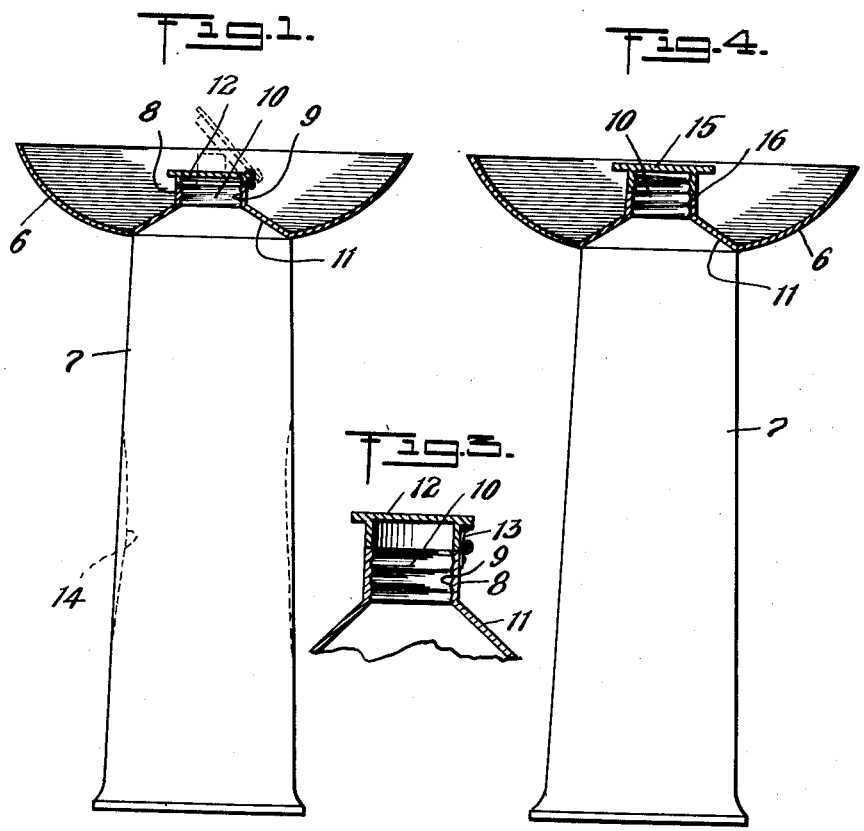
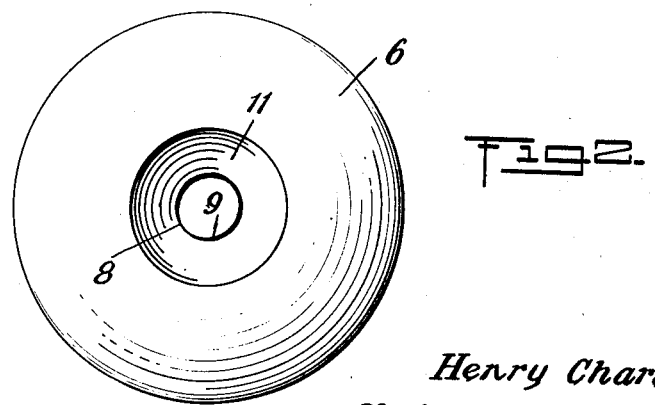
Inventor
Henry Charles Laufe
By his Attorney Patented June 13, 1933

1,913,811

UNITED STATES PATENT OFFICE

HENRY CHARLES LAUFE, OF BOGOTA, NEW JERSEY

SHAVING RECEPTACLE

Application filed December 30, 1929. Serial No. 417,568.

This invention relates to receptacles for shaving, and more particularly to that type of receptacle used for mixing purposes, for instance: as a shaving cup or lather receptacle.

Among the principal objects of the invention are:—To provide a combination container stand and mixing chamber; to enable a tube of cream to be held securely by the receptacle; to prevent leakage of the cream from a tube when the tube is not in use; to permit use of the usual tube cap to be used as its closure when applied to the receptacle; to mount the tube so its contents will discharge into the receptacle to be mixed; to secure simplicity of construction; and to obtain other advantages and results as may be brought out in the following description:

In the drawing:

Figure 1 is a longitudinal sectional view of a receptacle, within which is held a tube of cream, Figure 2 is a bottom plan of the receptacle; with the tube of cream omitted, Figure 3 is an enlarged sectional view of the receptacle, partly broken away, and Figure 4 is a modified form of receptacle and tube, varying slightly from Figure 1.

In one specific embodiment of the invention illustrated in said drawing, and referring to Figures 1 to 3 inclusive, the reference numeral 6 indicates a cup-like bowl or container, which provides means for attaching a collapsible tube 7 thereto, such as a tube of shaving cream. While receptacle 6 may be constructed of any suitable material, it is preferably made of metal or the like, so as to be cheaply manufactured, and thereby permit the same to be sold at a low price. In the bottom of the bowl is an inwardly projecting neck 8 providing a perforation through the bottom longitudinally of the neck with internal threads 9 therein for receiving a threaded nipple 10 of the tube applied from the under-side of the cup-like bowl.

The threaded nipple of the tube in the disclosure now being described, extends only part way up in the tapped perforation or neck, being prevented from extending by an interior shoulder 11 formed in the neck perforation, and against which the tapered shoulder of the tube abuts, when applied. This shoulder 11 also insures a snug fit of the tube in the receptacle.

In order that the flow of the cream from the tube may be limited, means are provided on the tapped perforation or neck 8 for closing the neck and thereby closing the tube. This closing may be automatic if desired, to permit a certain amount of the cream to escape when pressure is applied to the tube 7. Upon release of the pressure the closure shuts down to keep the remaining cream in the tube fresh. Said closure means may be in the form of a hinged cover 12 of substantially the outside diameter of the neck, the interior of said cover being hollow to permit fitting over the upwardly extending nipple 10 of the tube 7.

A suitable spring 13 is associated with the cover for normally closing the same. As shown, this spring 13 is a coil, or loop, with one end secured to the hinged cover by any suitable means, and with its other end fastened to the outside of the neck 8 of the bowl 6. This spring not only automatically closes to cut off the supply, but also assures holding the cover securely down in place, thereby preventing any leakage of the cream from within the tube.

When applying pressure to the tube in use as by squeezing it as indicated by dotted lines 14, the cream moves upwardly, thereby forcing the hinged cover 12 from its closed position over the nipple 10, and raising the cover far enough as shown at 15 to eject the cream to an extent dependent upon the pressure applied. Because of the construction of the receptacle 6, the ejected cream will be thus directly introduced into the bowl ready to be stirred into a lather therein. During this operation, the receptacle may be conveniently supported by utilizing the tube as a handle in a manner not applying pressure thereto as will readily be appreciated. Since the cover 12 is protecting the contents of the tube, mixing the lather in the bowl has no ill effects upon the cream still in the tube. After use, the bowl can be easily and thoroughly washed out, also with no injury or contact with the cream still in the tube and without removing the tube from the receptacle. The rim of the tube is preferably in a plane or flat, so the receptacle can be inverted with said rim downward and resting on a shelf or other surface with the tube in an upright position, cap down.

Another form of the invention is shown in Figure 4 utilizing the usual screw cap of the tube with which tubes of this sort are usually equipped when purchased. In this showing, the parts are proportioned so that the thread neck 15 of the receptacle is shorter than the threaded nipple 16 of the tube 7 and therefore the nipple will project through the neck. The cap 17 which came on the tube originally may then be secured back on the projecting end of the nipple for effecting a closure. In this construction, as in that previously described, the end of the neck and the end of the cap abut for effecting a tight closure. In this instance, the cap is unscrewed; desired cream is ejected into the bowl and the cap returned to closing position, after which the cream may be stirred into a lather, utilizing the tube as a holding means. When the contents of the tube 7 has been completely used, the tube may be released from the receptacle and a new tube may then be inserted.

Another important feature of the invention is that when the user has completed using the receptacle, he may then place it in a cabinet or the like, in an inverted position, thereby preventing dirt, etc. from entering the inclosure of the receptacle.

While I have herein described the device as preferably used in connection with shaving cream and as a shaving receptacle, it will be understood that I am not limited to such use or employment, as it may be used in conjunction with collapsible tubes of tooth paste or other similar material and for other uses and employments, all of which I consider to be within the scope of the following claim.

I claim:

A device as characterized comprising a bowl having an upwardly projecting conical portion therein shaped to fit the shoulder on a tube of cream or the like, whereby cream may be ejected into the bowl, a cap on said tube, and means for lifting said cap under pressure of the cream being ejected into the bowl, and said means automatically closing the cap when no pressure is used.

HENRY CHARLES LAUFE.